United States Patent [19]
Koegel et al.

[11] Patent Number: 5,950,406
[45] Date of Patent: *Sep. 14, 1999

[54] METHOD AND APPARATUS FOR MACERATING PLANT MATERIAL

[75] Inventors: Richard G Koegel, Madison; Richard J Straub, Brooklyn; Timothy J Kraus, Madison, all of Wis.

[73] Assignee: New Holland North America, Inc., New Holland, Pa.

[*] Notice: This patent is subject to a terminal disclaimer.

[21] Appl. No.: 08/884,277

[22] Filed: Jun. 27, 1997

Related U.S. Application Data

[60] Provisional application No. 60/020,782, Jun. 28, 1996.
[51] Int. Cl.$^6$ .................................................. A01D 82/00
[52] U.S. Cl. ......................... 56/14.5; 56/16.4 A; 56/504; 56/DIG. 1
[58] Field of Search ........................... 56/14.5, 6, 16.4 A, 56/16.4 B, 16.4 C, 14.6, DIG. 1, DIG. 2, 504, 505

[56] References Cited

U.S. PATENT DOCUMENTS

| | | | |
|---|---|---|---|
| 445,313 | 5/1891 | Elliott et al. | 56/16.4 |
| 4,265,076 | 5/1981 | Krutz | 56/14.4 |
| 4,747,260 | 5/1988 | Petrasch et al. | 56/14.5 X |
| 4,862,681 | 9/1989 | Linde et al. | 56/16.4 |
| 5,152,127 | 10/1992 | Koegel et al. | 56/14.1 |
| 5,327,709 | 7/1994 | Webb | 56/15.8 |

*Primary Examiner*—Terry Lee Melius
*Attorney, Agent, or Firm*—Frank A. Seemar; Larry W. Miller; J. William Stader

[57] ABSTRACT

Apparatus and method for processing plant material in which a first rotatable crushing roller with an outer generally cylindrical surface cooperates with a second adjacent rotatable crushing roller also having an outer generally cylindrical surface. The rollers, mounted with their surfaces positioned in close proximity to each other, rotate in opposite directions to receive and crush plant material. A rotatable impact rotor having a plurality of outwardly extending projections is mounted rearwardly of the crushing rollers for impacting plant material that has passed between the rollers to macerate the plant material that has been previously crushed by the rollers. The crushed and macerated plant material is diverted and again impacted one or more times by the outwardly extending projections of the impact rotor.

24 Claims, 6 Drawing Sheets

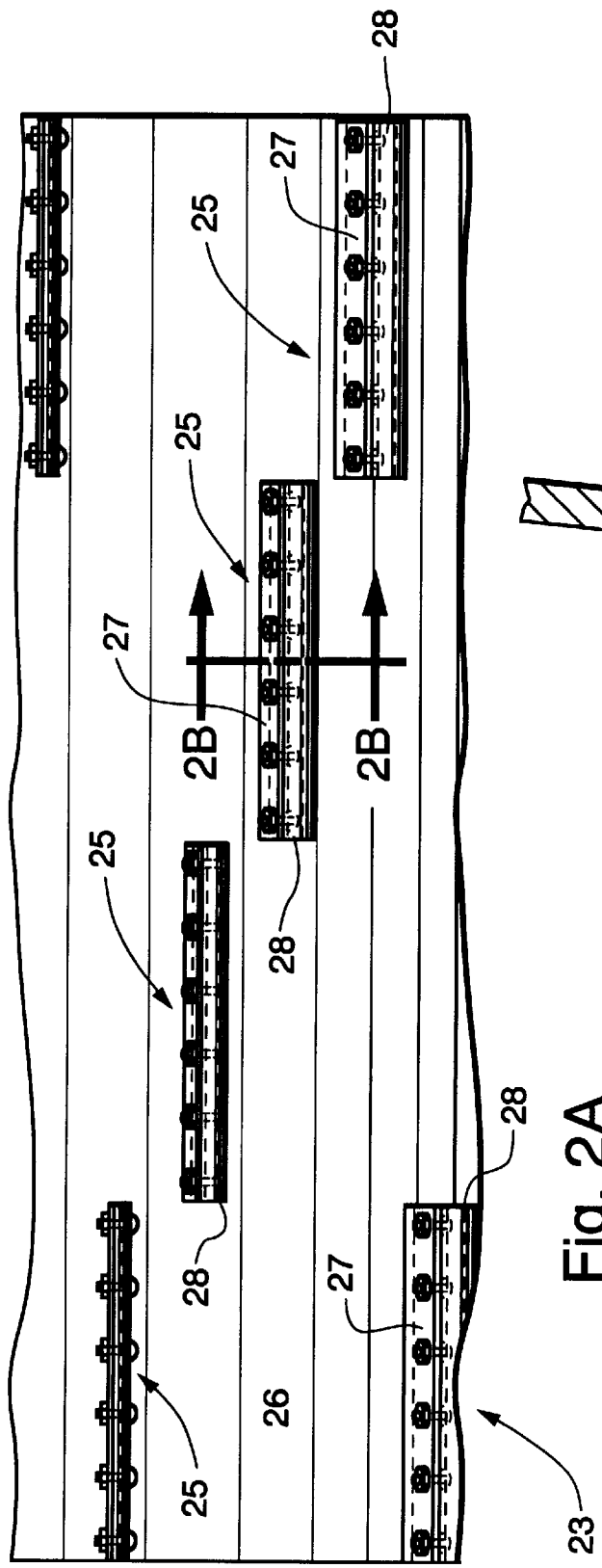
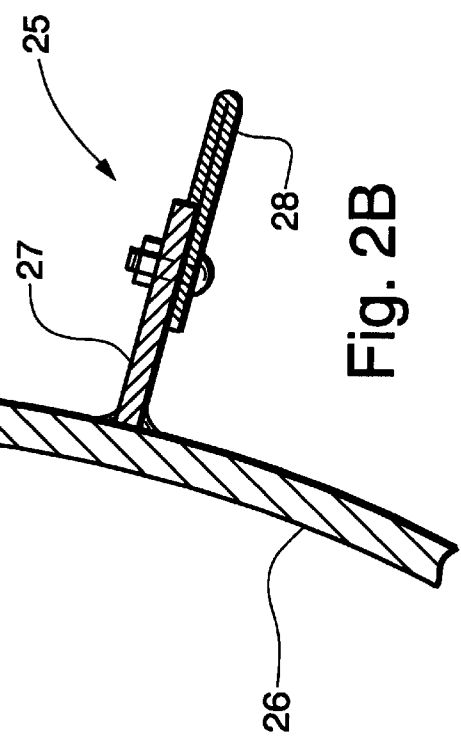
Fig. 2A
Fig. 2B

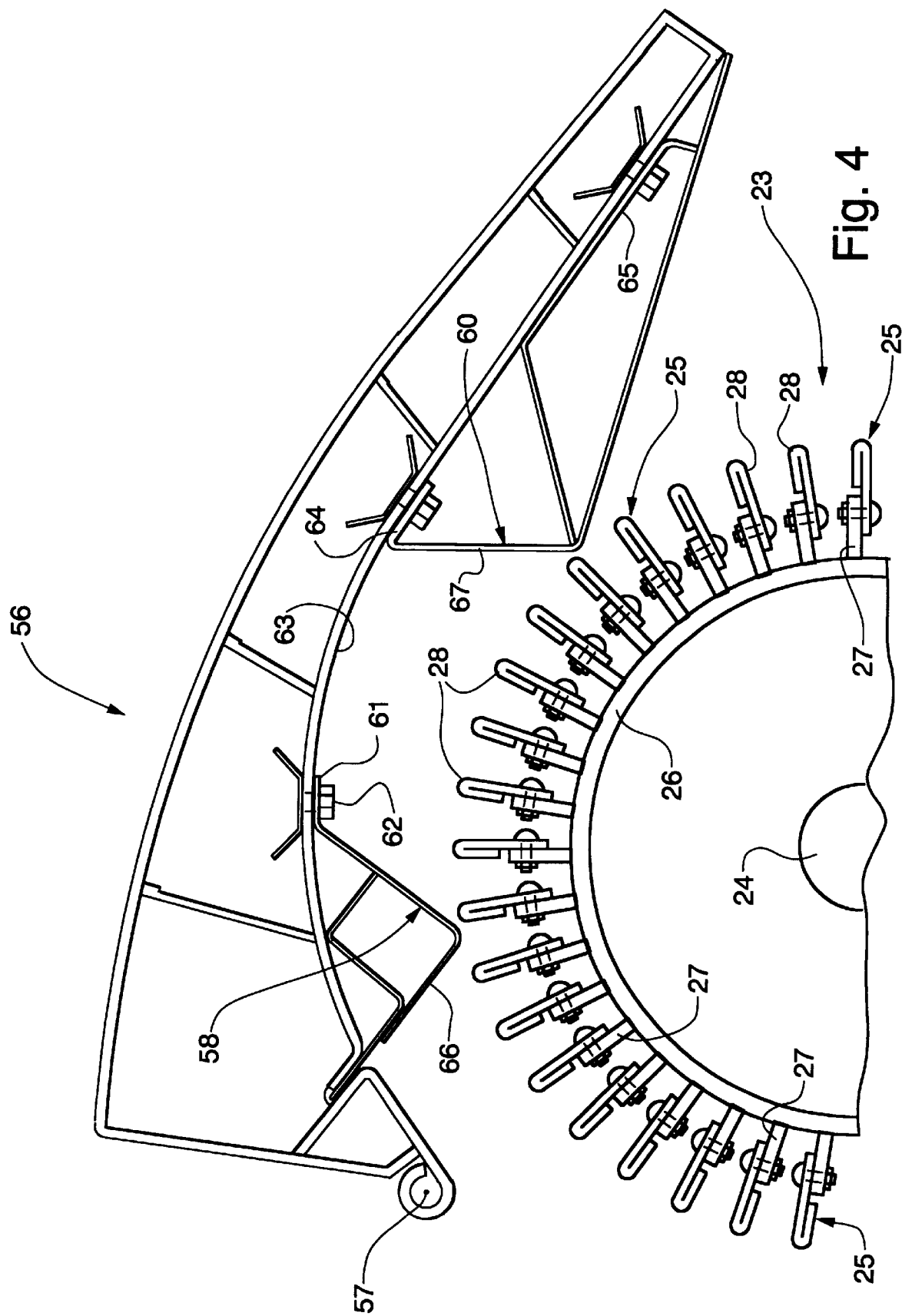

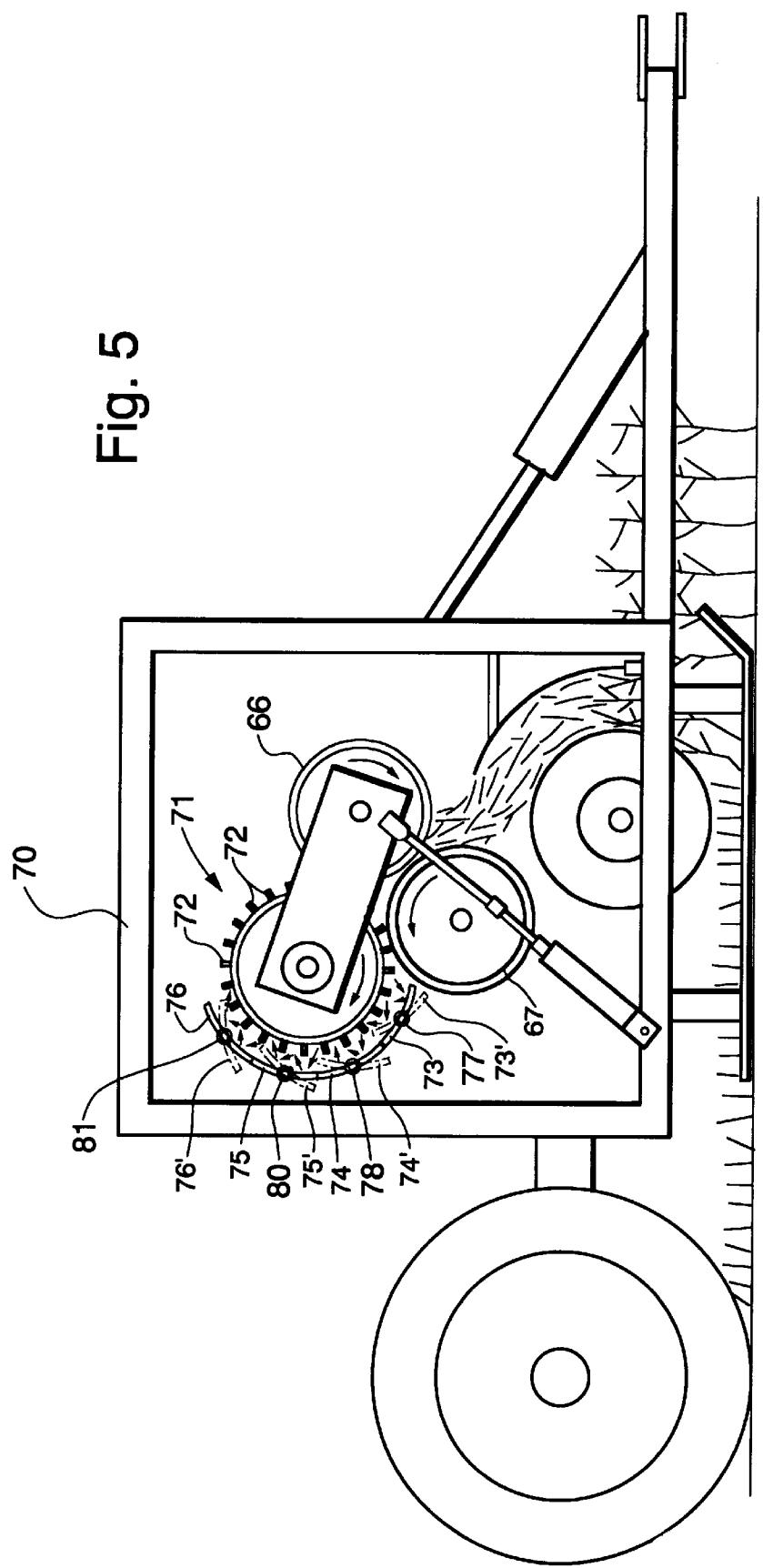

METHOD AND APPARATUS FOR MACERATING PLANT MATERIAL

CROSS REFERENCE TO RELATED APPLICATION

This application claims the benefit of U.S. Provisional Application No. 60/020,782, filed Jun. 28, 1996.

This invention was made with United States government support awarded by the following agencies:

USDA CRIS PROJECT NO. 3655-21410-001-00D; HATCH PROJECT 1708.

The United States has certain rights in the invention.

FIELD OF THE INVENTION

The present invention relates generally to a method and apparatus for severely conditioning plant material and more particularly to a method and apparatus for macerating plant material by first crushing the material and then impacting and reimpacting the crushed plant material.

BACKGROUND OF THE INVENTION

During the process of producing and harvesting hay it is common to condition stalky plant material such as alfalfa, clover, or the like, by crimping the stems. This cracks the stems and thereby reduces the time cut plant material remains in the field by increasing the rate at which moisture escapes. U.S. Pat. No. 4,445,313, issued May 1, 1984 in the name of Thomas Elliott et al, discloses a machine illustrative of the general principle of conditioning by crimping. Another example of prior art showing conditioning by crimping is U.S. Pat. No. 4,862,681, issued Sep. 5, 1989 in the name of Gilbert W. Linde et al, which discloses conditioning rolls that crimp and also reciprocate relative to each other to enhance the conditioning.

In addition to crushing or crimping, it is also well known that plant drying can be further enhanced by subjecting the crushed plants to additional conditioning that causes the plant stems to be severely crushed and/or fiberized. This very severe conditioning is commonly referred to as maceration. The various levels of conditioning to which plant materials are subjected has a direct affect on the drying rate. Another benefit of severe conditioning, i.e., maceration, is that studies have shown that macerated hay enhances digestibility. Maceration is also carried out as a precursor to juice expression from herbage, where industrially valuable products, such as enzymes or nutritional substances are then extracted from the plant juice.

An example of prior art apparatus for macerating plant material, such as forage crops, is shown in U.S. Pat. No. 4,265,076, issued May 5, 1981 in the name of Gary W. Krutz, wherein a self propelled implement is disclosed. The crop material is macerated by a pair of opposing crushing rolls with differential peripheral speeds, after which it is conveyed to a press to form a mat that is discharged rearwardly onto the field over which the implement is being operated.

Another example of prior art apparatus for macerating plant material, also referred to as herbage, is shown in U.S. Pat. No. 5,152,127, issued on Oct. 2, 1992 in the name of Richard G. Koegel et al ("'127 patent"), This patent, hereby incorporated by reference in its entirety, provides an extensive explanation of background material relating to severe conditioning. The '127 patent discloses an implement for processing herbage, such as forage crop material, by cutting standing crop, feeding the cut crop material to a pair of crushing rollers to initially crack the stems of the plants, and subsequently impacting the crushed forage crop material to provide additional fiberization.

The present invention contemplates an improvement over known methods and apparatus.

SUMMARY OF THE INVENTION

An important object of the present invention is to provide simple and reliable apparatus for impacting plant material one or more times after it has been severely conditioned.

Another important object of the present invention is to provide a simple and reliable method for treating plant material by reimpacting plant material one or more times after it has been crushed and impacted.

In pursuance of these and other important objects, the present invention contemplates harvesting apparatus for processing plant material comprising pickup means for picking up the plant material, crushing means for receiving the plant material from the pickup, crushing the plant material, and expelling it along a path in a generally rearward direction, impaction means for receiving the plant material from the crushing means, the crushed plant material being impacted by the impaction means and directed outwardly therefrom, and means in the path of the outwardly directed impacted plant material for diverting it inwardly to be reimpacted by the impaction means.

The present invention also contemplates a method for treating plant material comprising the steps of crushing plant material, expelling the crushed plant material in a downstream direction, guiding the crushed plant material into the path of impacting means after it has been crushed, impacting the crushed plant material, guiding the impacted plant material into the path of the impacting means, and reimpacting the impacted plant material.

More specifically, in one embodiment the present invention contemplates improved apparatus for processing plant material wherein the apparatus comprises a first rotatable crushing roller having an outer generally cylindrical surface, a second rotatable crushing roller having an outer generally cylindrical surface positioned in close proximity to the outer surface of the first roller, the first and second rollers being adapted to rotate in opposite directions to form crushed plant material under conditions where such material is passed between the rollers and urged downstream, and a rotatable impact rotor having a plurality of outwardly extending projections, the impact rotor being mounted downstream from the first and second rotatable crushing rollers and in the path of crushed plant material that has passed between the rollers, whereupon the crushed material is impacted by the outwardly extending projections to macerate the crushed plant material, the improvement comprising means mounted outwardly of the impact rotor to divert the macerated plant material back into the impact rotor for reimpaction by the outwardly extending projections of the impact rotor.

In another embodiment, the present invention contemplates apparatus that accomplishes impaction and reimpaction of plant material being processed by providing for the addition of unique diverters adjacent the outer periphery of an impaction rotor of the type employed in the apparatus of the '127 patent. By placing one or more diverters in the path of previously crushed material, the material is propelled by the impaction rotor against such one or more diverters which direct it back into the impacting rotor. Thus, by increasing the number of operative diverters the number of impacts carried out on the material being processed is varied, and, consequently, maceration intensity can be varied in accordance with the desired degree of conditioning and with the condition and type of material being handled. For example, when the vegetation being processed is mature and requires a high level of processing due to its mechanically stronger state, the number of diverters can be increased over the number used when the vegetation is less mature.

The foregoing and other objects, features and advantages of the invention will appear more fully hereinafter from a consideration of the detailed description which follows, in conjunction with the accompanying sheets of drawings wherein one principal embodiment of the invention is illustrated by way of example, along with other alternative embodiments. It is to be expressly understood, however, that the drawings are for illustrative purposes and are not to be construed as defining the limits of the invention.

DESCRIPTION OF THE DRAWINGS

FIG. 2A is a view taken in the direction of arrows 2A—2A in FIG. 2.

FIG. 2B is a view taken in the direction of arrows 2B—2B in FIG. 2A.

FIG. 4 is a partial diagrammatical elevational view similar to FIG. 2 showing key elements of yet another embodiment of the present invention.

FIG. 5 is a diagrammatical elevational view illustrating still another embodiment of the present invention.

DESCRIPTION OF THE INVENTION

Figure 1:
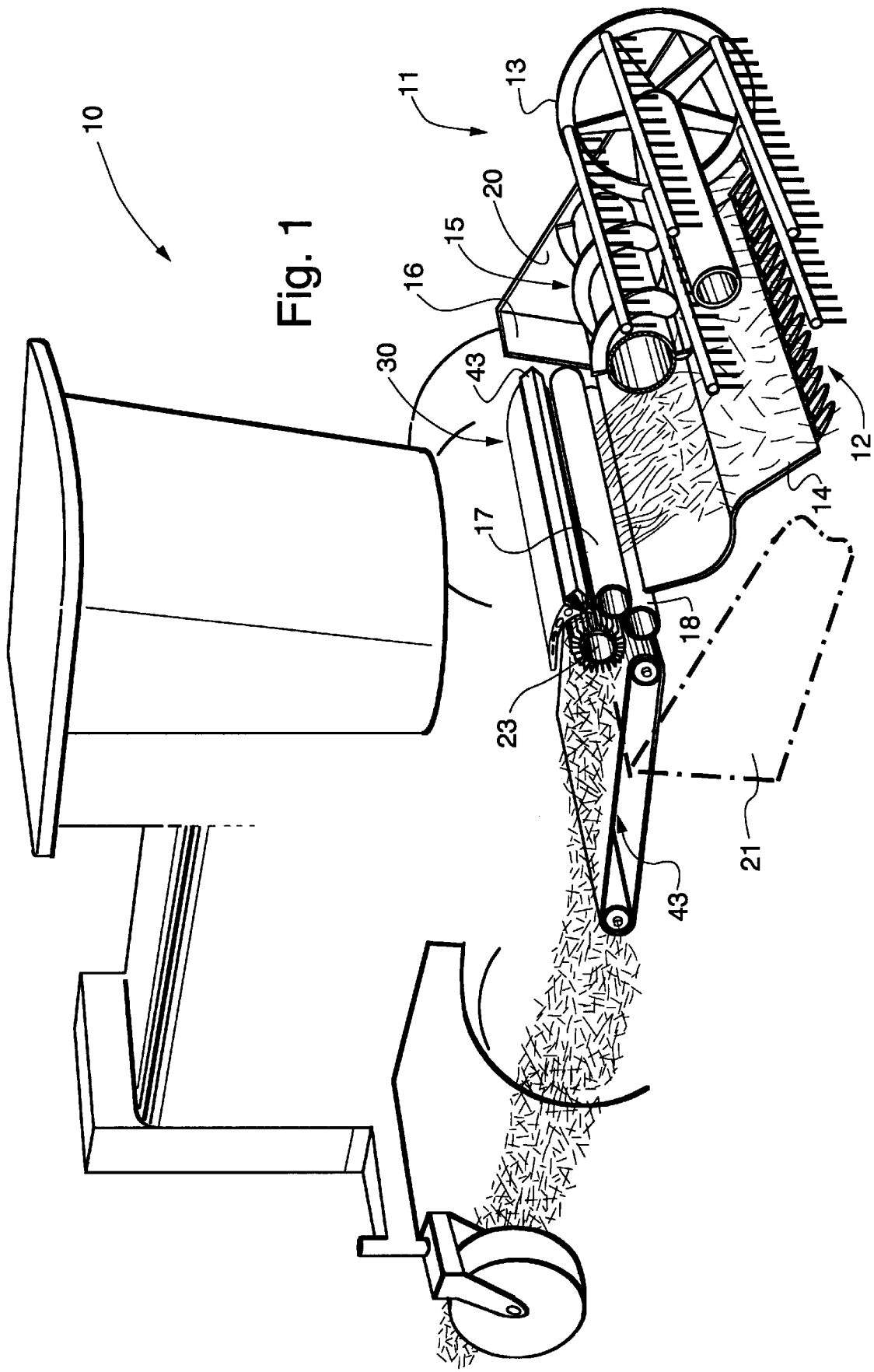
FIG. 1 is a diagrammatical perspective view of self propelled harvesting apparatus in which one embodiment of the present invention is incorporated.

Referring now to the drawings for a more detailed description of the present invention, FIG. 1 diagrammatically shows a self propelled implement, designated by reference numeral 10, having a forwardly extending header 11 suspended from a frame in a conventional manner. The header includes a forwardly positioned transverse cutterbar 12 disposed in close proximity to the ground to sever standing plant material, a reel 13 for engaging the severed plant material and conveying it rearwardly over a floor 14, and a transverse auger 15 that consolidates the rearwardly conveyed plant material and discharges it through an opening (not shown) in a wall 16 extending upwardly from floor 14. The structure and function of header 11 is well known in the art, an example of which is shown and described in U.S. Pat. No. 5,327,709, issued Jul. 12, 1994 in the name of Bryant Webb, hereby incorporated by reference. The prior art elements of header 11 are depicted in a cut-away fashion to facilitate understanding.

Figure 2:
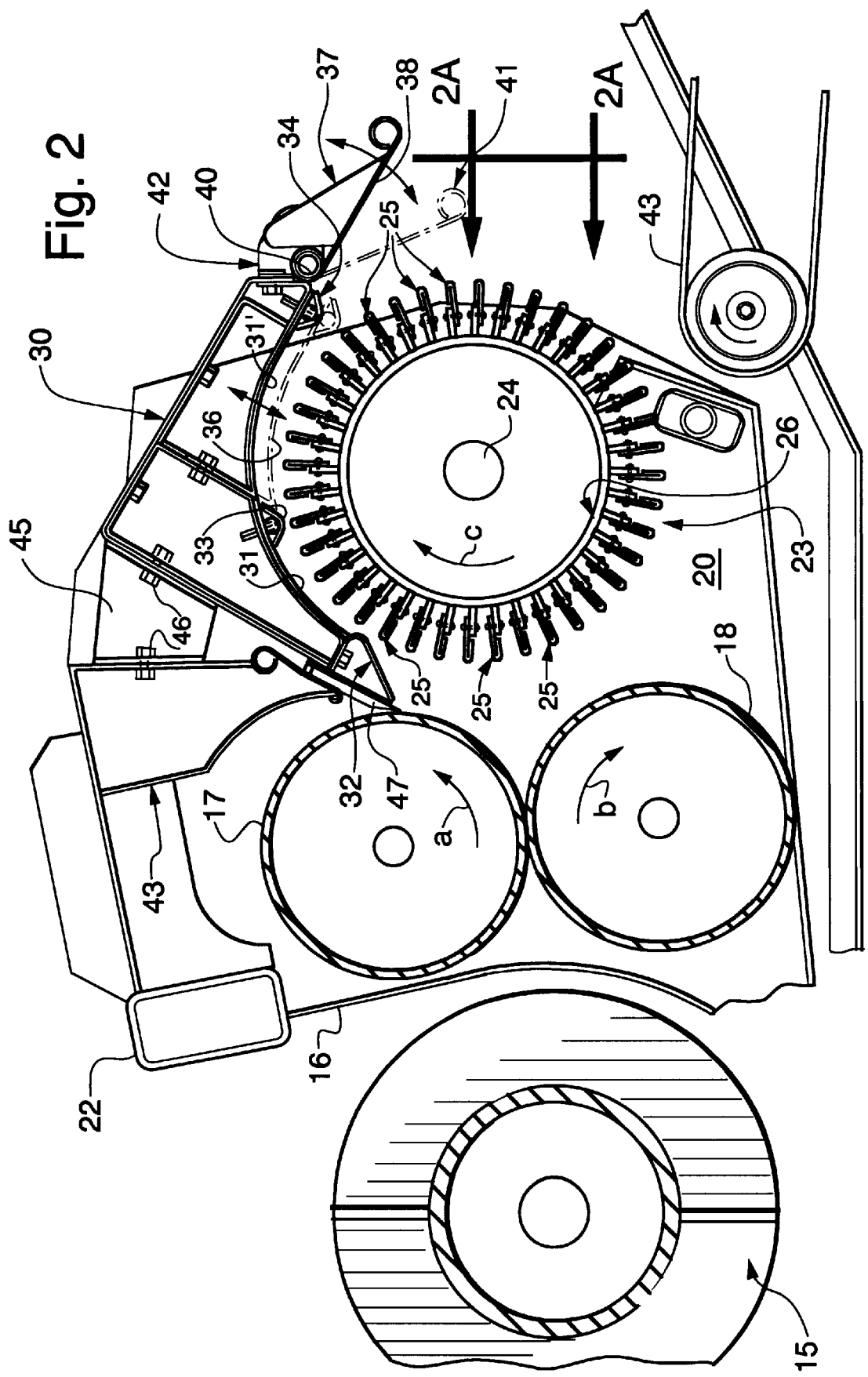
FIG. 2 is an elevational view illustrating in further detail the key elements of the preferred embodiment of the apparatus shown in FIG. 1.

In the embodiment depicted in FIG. 1 and shown in further detail in FIG. 2, crushing rolls 17, 18 are rotatably mounted on header 11 behind wall 16 in general transverse alignment with auger 15. The rotational direction of crushing rolls 17, 18 is illustrated by directional arrows a and b in FIG. 2. Crushing rolls 17, 18 are journalled in bearing assemblies mounted on sides walls 20, 21 of header 11 and driven by conventional means, such as chains, belts, gears, hydraulics, or a combination thereof. To accomodate varying thicknesses of plant material being crushed, rolls 17, 18 can be spaced and/or spring loaded toward each other in a conventional manner. The outer surfaces of crushing rolls 17, 18 are aggressive to improve feeding characteristics.

As depicted in FIG. 1, side wall 21 is shown in phantom to illustrate its position and thereby provide an unobstructed view of the elements of harvester 10, some of which elements are cutaway, as noted above. Cross beam member 22, which provides structural support and strength to header 11, extends between sidewalls 20, 21. Rear wall 16, mounted to cross beam member 22, extends from side to side between auger 15 and crushing rolls 17, 18, and is provided with the discharge opening mentioned above for appropriate unimpeded ingress of material to crushing rolls 17, 18.

Impact rotor 23, also mounted on header 11, is similarly journalled in opposing bearing assemblies mounted on side walls 20, 21 adjacent crushing rolls 17, 18. Conventional drive means rotate impact rotor 23 in the direction of arrow c, i.e., in a clockwise direction when viewed from the right side of the apparatus shown in FIGS. 1 and 2, about transverse axis 24. The position of axis 24 is adjustable vertically and horizontally to modify the spacing and vertical relationship between crushing rolls 17, 18, and impact rotor 23.

More specifically, impact rotor 23 comprises a plurality of outwardly extending rigid fins 25 (see FIGS. 2A and 2B) equidistantly spaced along the outer surface of a cylindrical core 26. Each fin 25 includes a radially extending transverse strut 27 welded to core 26. An impact element 28 is affixed to each strut 27, which elements also extend in a generally radial direction and have a rounded leading edge. Referring to FIGS. 2A and 2B, in the preferred embodiment impact elements 28 are bolted to struts 27, which are affixed to core 26 in a staggered and segmented manner. Among others things, this segmented array enables replacement of separate segments due to wear or damage and greatly reduces time, effort and expense during routine servicing or field repair. Further, by staggering the segments from row to row, the adjacent staggered segments engage the crop in a sequential manner which reduces lateral load characteristics.

A deflector hood assembly 30, mounted between side walls 20, 21, comprises an inwardly facing arcuate surface 31, 31' to which a plurality of guide elements 32, 33, 34 are secured. More specifically, guide element 32 is triangularly shaped in cross section with a flat impact surface 35 in the downstream path of plant material that has been crushed by rolls 17, 18, impacted by rotor 23, and then impelled in a general upward direction. Surface 35 extends from side to side with its rear portion terminating in the vicinity of the cylindrical path of the tips of impact elements 28. Guide elements 33, 34, similar in configuration to each other, are angularly shaped and selectively attached along surface 31, 31'. Rearmost element 34 is radially adjustable relative to the cylindrical path of the tips of impact elements 28 by virtue of moveable segment 36 of inwardly facing wall 31, the innermost position of which is shown in phantom outline.

An auxiliary hood 37 comprises a flat inwardly facing deflection element 38 pivotally mounted to deflector hood assembly 30 at pivot assembly 40 for adjustment between an inner position 41 shown in phantom outline, and an outer position shown in solid lines. Deflection element 38, secured to pivot assembly 40 by two or more vertically disposed flanges 42, is continuous from side to side with its forward edge contiguous with the rearward edge of inwardly facing surface 31'. The purpose of the auxiliary hood is to vary the discharge path of processed material onto a conveyor 43, generally shown in FIG. 1 and partly shown in FIG. 2, operatively mounted downstream from impact rotor 23 for conveying processed crop rearwardly.

Intermediate frame assembly 44 is disposed between sidewalls 20, 21 to provide structural integrity via intermediate brackets 45 (one shown) affixed between deflector hood 30 and assembly 43 by bolts 46, or other suitable holding means. Attached to frame assembly 43 is scrapper 47 with an edge in operative relationship with the surface of crushing roll 17 for functioning in a well known manner.

Figure 3:
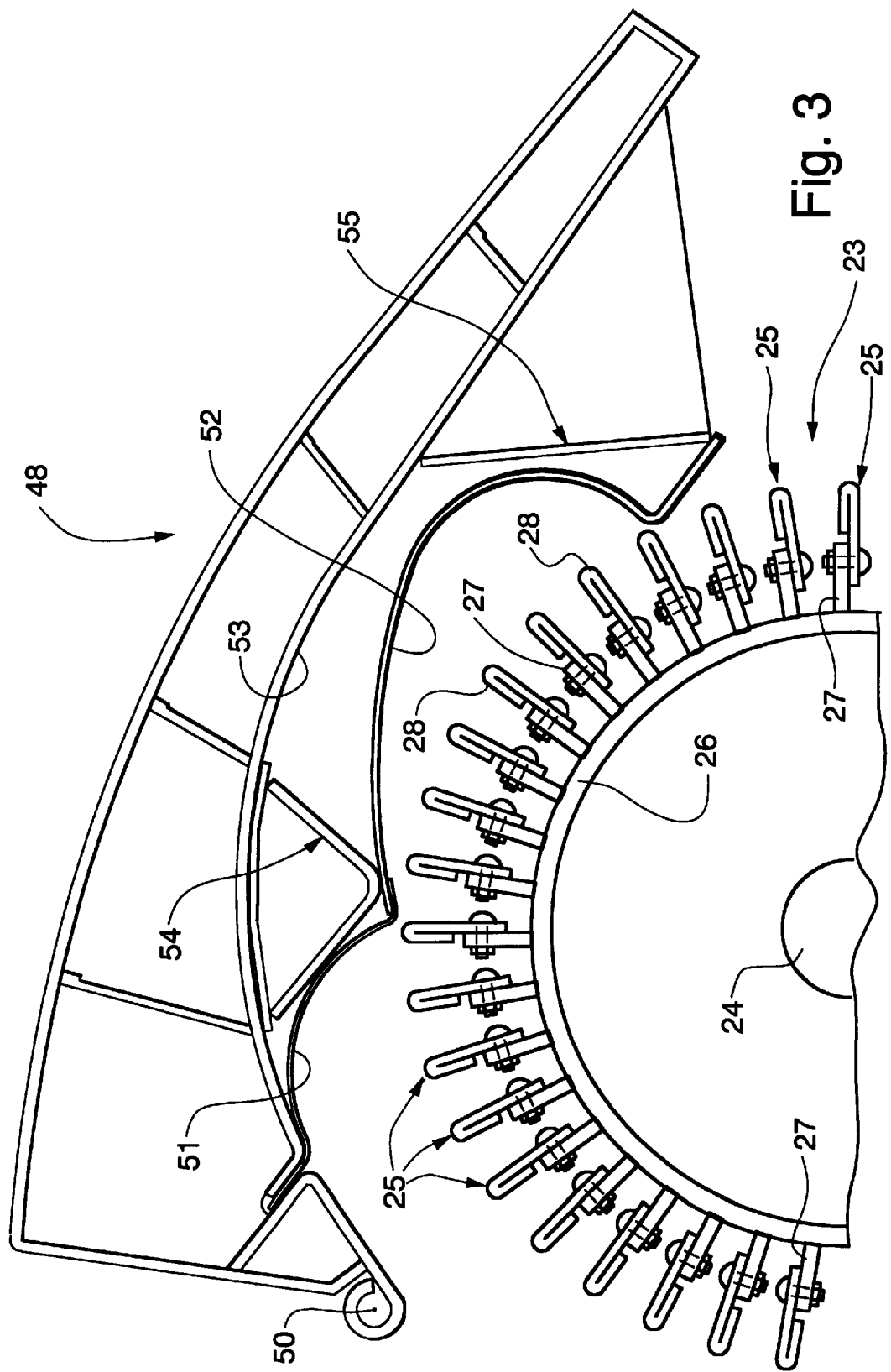
FIG. 3 is a partial diagrammatical elevational view similar to FIG. 2 showing key elements of another embodiment of the present invention.

In FIG. 3, an alternative embodiment is illustrated wherein similar crushing rolls are used in conjunction with impact rotor 23 and a deflector hood assembly 48, pivotally adjustable about transverse axis 50. Arcuate guide surfaces 51, 52 are affixed to the inner surface 53 of hood assembly 48 via intermediate retaining elements 54, 55. Plant material is engaged by surfaces 51, 52 in a manner similar to guide elements 32, 33 of the FIG. 2 embodiment, i.e., as it is being conveyed along a generally circumferential path after initial impaction. Guide surface 51 redirects the material back against impact elements 28 of impact rotor 23 whereupon reimpaction takes place that in turn redirects the material away from impact rotor 23 and into guide surface 52, which again redirects the material back toward impact elements 28 for another reimpaction to further macerate the plant material prior to being discharged from hood assembly 48 onto a rearwardly transporting conveyor 43 of the type depicted in FIGS. 1 and 2. In this embodiment the discharge path of the macerated material can be varied by pivoting hood assembly 48 about transverse axis 50.

In FIG. 4, another alternative embodiment is illustrated wherein similar crushing rolls are used in conjunction with impact rotor 23 and a deflector hood assembly 56, pivotally adjustable about transverse axis 57. In a manner similar to the FIG. 2 embodiment, guide elements 58, 60 are affixed to the inner surface of deflector hood 56 to engage plant material as it is being conveyed along its generally circumferential path. Guide element 58 is angularly shaped with a transverse flange 61 for receiving a plurality of bolts 62 (one shown) for securing it to the inner surface 63 of hood 56. In a like manner guide element 60 is angularly shaped and includes inwardly turned flanges 64, 65 for securement to the hood. Leading surface 66 of element 58 redirects material back against impact elements 28 whereupon reimpaction takes place that in turn redirects the material away from impact rotor 23 and into transverse leading surface 67 of element 60, which in turn again redirects the material against impact elements 28 of rotor 23 for additional reimpaction to further macerate the plant material prior to being discharged from the hood onto a rearwardly transporting conveyor. In this embodiment, as in the FIG. 3 embodiment, the rearward discharge path of the macerated plant material can be varied by pivoting hood assembly 56 about transverse axis 57.

In FIG. 5 key elements are diagrammatically shown of still another embodiment of the present invention. In this regard reference is made to the abovementioned '127 patent, previously incorporated by reference, wherein apparatus having similar elements is shown and discussed. More specifically, the apparatus of FIG. 5 includes first and second counter rotating crushing rolls, 67, 68, mounted on frame 70 forwardly of an impact rotor 71 having outwardly extending projections 72. As in the '127 patent plant material passes between the crushing rolls after which it is directed against projections 72 of impact rotor 71. In close proximity to the periphery of the impact rotor are a plurality of arcuate diverter blades 73, 74, 75, 76 pivotally mounted for individual adjustment about pivots 77, 78, 80, 81 relative to the path of the plant material. Each blade is selectively adjustable from an outer position, where it is aligned with and substantially parallel to the circular path of the tips of projections 72 of rotor 71, to an inner position where the inner tip of the blade is adjacent the path of the tips of projections 72. For example, the inner positions of diverter blades 73, 74, 75, 76, are illustrated by reference numerals 73', 74',75',76', respectively. Thus, by selectively pivoting one or more of the diverter blades to its inner position, the material that has been crushed and impacted can be immediately redirected into the impact rotor for a selected number of additional impactions, each of which will progressively increase the degree of processing.

In operation, each of the above discussed configurations provides for crushing, impaction and reimpaction of plant material being processed. In the embodiment shown in FIG. 5, the impact rotor engages the crushed material as it rotates downwardly, whereas in the other arrangements the impact rotor impacts the crushed material as it rotates upwardly, but regardless of direction of rotation all configurations accomplish the unique function of reimpaction of plant material, e.g., forage crop material, that has been crushed and impacted. The invention contemplates in general an impact rotor mounted downstream from a crushing assembly and adjacent a hood. Material crushed by the crushing assembly is thrust against the fins of the impact rotor, which is rotating at a relatively high rate of speed. For example, with the crushing rolls rotating at 800 RPM, a typical speed for the impact rotor would be in a range of 1000 RPM to 3000 RPM, depending on the type and maturity of the crop being processed. The crushed material is macerated by the impact of the fins and deflected one or more times back to an area adjacent the rotor where it engages a deflector which guides it along a generally circumferential path to a conveyor assembly, conveyed rearwardly, and subsequently deposited on the surface of the field as depicted in FIG. 1. A pressing assembly (not shown) can also be employed rearwardly of the deflector hood, in which case the material is pressed into a mat prior to being deposited on the field.

Of the many implicit and explicit advantages of the present invention one of the most important is the provision of apparatus that allows the extent of maceration of plant material to be selected within a wide range. This extends the application of the maceration apparatus from moderate conditioning for accelerated field drying to very severe maceration where it is desired to express juice from the herbage as a source of value added products. Examples of potentially significant valuable value added products are livestock and/or food-grade protein concentrates, pigmenting agents for the poultry industry, and industrially valuable enzymes.

While preferred structure in which the principles of the present invention are shown and described in the embodiments above, it is to be understood that the invention is not limited to such preferred structure, but that, in fact, widely different means of varying scope and configuration may be employed in the practice of the invention. Further, while the unique apparatus and method of the present invention is discussed above, in some instances, as being adaptable to handle forage crop material, it is not intended that it be limited to that type of herbage.

Having thus described the invention, what is claimed is:

1. Improved apparatus for processing plant material comprising
   a first rotatable crushing roller having an outer generally cylindrical surface,
   a second rotatable crushing roller having an outer generally cylindrical surface positioned in close proximity to the outer surface of said first roller, said first and second rollers adapted to rotate in opposite directions to form crushed plant material under conditions where such material is passed between said rollers and urged downstream under conditions where said rollers are rotating, and a rotatable impact rotor having a plurality of outwardly extending projections, said impact rotor mounted about a generally transverse axis downstream from and generally aligned with said first and second rotatable crushing rollers and in the path of crushed plant material that has passed between said rollers, whereupon said crushed material is impacted by said outwardly extending projections to macerate said crushed plant material, the improvement comprising baffle means mounted outwardly of said impact rotor to divert said macerated plant material back into said impact rotor for reimpaction of said macerated plant material by said outwardly extending projections of said impact rotor.

2. Apparatus for processing plant material as set forth in claim 1 wherein said baffle means comprise a hood having an inwardly facing surface mounted above said impact rotor.

3. Apparatus for processing plant material as set forth in claim 2 wherein said baffle means further comprise a guide element secured to said inwardly facing surface.

4. Apparatus for processing plant material as set forth in claim 2 wherein said improvement further comprises means for adjusting said hood about an axis generally parallel to the axis of said impact rotor to vary the rearward trajectory of said reimpacted plant material.

5. Apparatus for processing plant material as set forth in claim 3 wherein said guide element is adjustably mounted for varying its position relative to said impact rotor.

6. Apparatus for processing plant material as set forth in claim 3 wherein said guide element includes an arcuate surface.

7. Improved harvesting apparatus for processing plant material comprising a forwardly extending header including means for cutting standing plant material, said header also including means for conveying cut plant material rearwardly, crushing means for receiving said cut plant material from said header, crushing said plant material, and expelling it along a path in a generally rearward direction, and impaction means for receiving said plant material from said crushing means, said crushed plant material impacted by said impaction means and directed outwardly therefrom, the improvement comprising baffle means in the path of said outwardly directed impacted plant material for diverting it inwardly to be reimpacted by said impaction means.

8. Apparatus for processing plant material as set forth in claim 7 wherein said baffle means comprise a hood having an inwardly facing surface mounted above said impaction means.

9. Apparatus for processing plant material as set forth in claim 8 wherein said baffle means further comprise a guide element secured to said inwardly facing surface.

10. Apparatus for processing plant material as set forth in claim 8 wherein said improvement further comprises means for adjusting the position of said hood relative to said impact rotor to vary the rearward trajectory of said reimpacted plant material.

11. Apparatus for processing plant material as set forth in claim 8 wherein said guide element is adjustably mounted for varying its position relative to said impaction means.

12. Apparatus for processing plant material as set forth in claim 8 wherein said guide element includes an arcuate surface.

13. Harvesting apparatus adapted to traverse a field for cutting and processing plant material comprising in combination a forwardly extending header comprising a cutting assembly for cutting standing plant material, said header further comprising a conveying assembly for conveying cut plant material rearwardly, crushing means for receiving said cut plant material from said header, crushing said plant material, and expelling it along a path in a generally rearward direction, impaction means for receiving said plant material from said crushing means, said crushed plant material impacted by said impaction means and directed outwardly therefrom, and baffle means in the path of said outwardly directed impacted plant material for diverting it inwardly to be reimpacted by said impaction means.

14. Harvesting apparatus as set forth in claim 13 wherein said baffle means comprise a hood having an inwardly facing surface mounted above said impaction means.

15. Harvesting apparatus as set forth in claim 14 wherein said baffle means further comprise a guide element secured to said inwardly facing surface.

16. Harvesting apparatus as set forth in claim 14 further comprising means for adjusting the position of said hood relative to said impact rotor to vary the rearward trajectory of said reimpacted plant material.

17. Harvesting apparatus as set forth in claim 15 wherein said guide element is adjustably mounted for varying its position relative to said impaction means.

18. Harvesting apparatus as set forth in claim 15 wherein said guide element includes an arcuate surface.

19. Harvesting apparatus as set forth in claim 13 wherein said impaction means comprise a core member having a cylindrical outer surface, and a plurality of radially extending fins attached to said outer surface of said core member.

20. An impact macerator for treating plant material comprising an impact rotor rotatable about a rotor axis for impacting the plant material and impelling it randomly away from said rotor axis, and at least two baffles located generally outside of the orbit of said impact rotor and in the path of said plant material under conditions where it is being impelled randomly away from said rotor axis, each baffle being pivotable about a respective baffle axis located at a fixed distance from said rotor axis.

21. An impact macerator as set forth in claim 20 wherein said impact rotor further comprises a plurality of rigid fins extending radially outward from said rotor axis.

22. An impact macerator as set forth in claim 20 wherein said at least two baffles are arcuate shaped and have a home position at which the arcuate surface thereof conforms to the outer periphery of said impact rotor.

23. An impact macerator for treating plant material comprising an impact rotor comprising a plurality of rigid fins extending radially outward from and rotatable about a rotor axis for impacting the plant material and impelling it randomly away from said rotor axis, and a baffle located generally outside of the orbit of said impact rotor and in the path of said plant material under conditions where it is being impelled randomly away from said rotor axis, said baffle configured to redirect said plant material back toward said inpact rotor, and being pivotable about a respective baffle axis located at a fixed distance from said rotor axis to vary the angle at which said material is redirected.

24. An impact macerator as set forth in claim 23 wherein said baffle is arcuate shaped and has a home position at which the arcuate surface thereof conforms to the outer periphery of said impact rotor.

\* \* \* \* \*

UNITED STATES PATENT AND TRADEMARK OFFICE
CERTIFICATE OF CORRECTION

PATENT NO.    : 5,950,406
DATED         : September 14, 1999
INVENTOR(S)   : Richard G. Koegel, Richard J. Straub, and Timothy J. Kraus It is certified that error appears in the above-identified patent and that said Letters Patent is hereby corrected as shown below:

<u>Title page,</u>
Left column, lines six and seven below the heading, "New Holland North America, Inc., New Holland, Pa." should be -- United States of America, Department of Agriculture, Peoria, IL and Wisconsin Alumni Research Foundation, Madison, WI --.

Signed and Sealed this

Twenty-ninth Day of January, 2002

*Attest:*

*Attesting Officer*

JAMES E. ROGAN
*Director of the United States Patent and Trademark Office*